United States Patent [19]

Hartnett

[11] 4,250,202
[45] Feb. 10, 1981

[54] CAKE COMPOSITIONS CONTAINING HIGH FRUCTOSE CORN SYRUP

[75] Inventor: Deborah I. Hartnett, West Chester, Pa.

[73] Assignee: ICI Americas Inc., Wilmington, Del.

[21] Appl. No.: 938,824

[22] Filed: Sep. 1, 1978

[51] Int. Cl.³ ............................................. A21D 10/04
[52] U.S. Cl. ................................... 426/553; 426/654; 426/658
[58] Field of Search ............... 426/552, 555, 653, 654, 426/658, 553

[56] References Cited

U.S. PATENT DOCUMENTS 3,346,389  10/1967  Evans et al. .......................... 426/555
3,782,970  1/1974   Tomita et al. ........................ 426/658

OTHER PUBLICATIONS

Koepsel et al., Cereal Chem. 57 "(1) Effects of Corn Syrups in Layer Cakes", 1/80, pp. 49–53.
Bean et al., "Corn Sweeteners in Cakes–Effects on Wheat Starch Gelatinization Properties", Presentation at the 60th Annual Meeting, American Association of Cereal Chemists, Kansas City, Mo., 10/75, pp. 92–155.
"High Fructose Corn Syrups for Bakery Applications", Saussele, Jr. et al., The Bakers Digest, 2/76.
"Use of High Fructose Syrups in White Layer Cake", Volpe et al., The Bakers Digest, 4/76.
"Wheat Starch Gelatinization in Sugar Solutions", Bean et al., Presentation at the 58th Annual Meeting of AACC, Mo. 11/73..
Jackel, "Corn Sweeteners: More Than an Alternative?", *Bakery Production,* 9/75, pp. 100–102 and 104–105.

*Primary Examiner*—Raymond N. Jones
*Assistant Examiner*—Elizabeth A. Hatcher

[57] ABSTRACT

Suitable cakes can be made where 100% of the sucrose normally employed is replaced by a blend of a high fructose corn syrup/corn syrup as sweetening agent. Satisfactory cakes result provided that mono and diglycerides of fat forming fatty acids and ethoxylated sorbitan monostearates are used in the presence of a single stage non-nucleating leavening agent, such as sodium aluminum phosphate, in addition to regularly included cake ingredients.

4 Claims, No Drawings

CAKE COMPOSITIONS CONTAINING HIGH FRUCTOSE CORN SYRUP

The present invention relates to improvements in batters used in the preparation of cakes, particularly high ratio cakes in which the ratio of sugar to flour is over 1:1 and 100% of the normally included sucrose is replaced by a high fructose corn syrup/corn syrup blend. The invention is particularly directed to cake formulas containing high fructose corn syrup/corn syrup blend as a sweetener, mono and diglycerides of fat forming fatty acids and polyethoxylated(20)sorbitan monostearate blends as emulsifier and a single stage non-nucleating leavener system such as sodium aluminum phosphate/sodium bicarbonate. The combined emulsifier leavening system makes it practical to employ high fructose corn syrup in the manufacture of sponge type snack cakes, white, and yellow layer cakes.

Traditionally when bakers added sweetener to bakery products either as a source of sweeteners, of fermentable sugars, or of reducing sugars, the sweetener choice was usually sucrose. In recent years, the price of sucrose has risen dramatically and the use of less expensive substitutes has been on the increase. Since corn syrups have remained lower in price on a solids basis and have some of the desirable properties of sucrose or invert sugar, their employment as a replacement for a portion of the sucrose normally employed in cake products has been fairly successful. However, corn syrup is less sweet than sucrose and cannot be substituted on a 100% basis.

Recently, a new sweetener has become available to the baking industry and is referred to as high fructose corn syrup-HFCS and on the average contains approximately 71% solids of which 50% is dextrose, 42% fructose and 8% other sugars in an aqueous solution. This product is made by an enzymatic isomerization process wherein d-glucose(dextrose) is converted to fructose as taught, for example, in U.S. Pat. No. 3,821,086. High fructose corn syrups made in this manner have sweetness equivalent to sucrose, contain fermentable sugars, have humectant properties, and are generally stable against crystallization. Furthermore, because it originates from corn syrup its equivalent in sweetness to sucrose can be obtained at a substantial reduction in price.

Corn syrup is a thick viscous liquid containing a mixture of dextrose, maltose and dextrins in about 20% water.

Until the development of this invention there has been no success in the substitution of the high fructose corn syrup for sucrose in the manufacture of cake since fructose, a reducing sugar, carmelizes and participants in the Maillard browning reaction more readily than sucrose. Therefore, a cake containing 100% HFCS has a browner crust and crumb color. In addition, such cakes have low volume, poor shelf life and poor grain. Until now satisfactory cakes have been made having only a partial substitution of HFCS for sucrose as reported by Saussele et al. *The Baker's Digest,* pp. 32–34, February, 1976; Volpe et al. *The Baker's Digest,* pp. 38–41, April, 1976; and Redfern et al., *The Baker's Digest,* pp. 26–31, April, 1972. These studies indicated that in certain applications sucrose/HFCS blends could contain up to 50% HFCS without affecting quality of the cakes.

It is an object of the invention to provide a formulation for manufacturing cakes wherein high fructose corn syrup is employed in place of sucrose.

It is another object of the invention to provide a process for the manufacture of satisfactory cakes employing HFCS an corn syrup as the sweetening agent.

These and other objects of the invention are accomplished by a series of counteracting adjustments of reaction rates which take place between starch and fructose when HFCS is used. Amylograph studies have shown that the starch-fructose-water slurries containing 100% HFCS gelled at a lower temperature and a faster rate than systems containing sucrose. It was further discovered that additions of mono and diglycerides of fatty acids, especially the saturated fatty acids, retard starch gelatinization by reacting within swelling granules or by reducing the rate of water absorption.

Furthermore, it was discovered that emulsifiers such as polyoxyethylene(20)sorbitan monostearate and the like tend to increase the water binding capacity (adsorption) of the flour and by doing so they reduce the amount of starch granule birefringence loss due to heating and rupturing and thus the amount of starch gelatinization. Thus, by blending a mono and diglyceride with another emulsifier, it is possible to retard the rate and amount of starch gelatinization. It is also noted that the use of an air classified flour increases the absorption in the slurry and produces a much higher viscosity at 90° C.

The term mono and diglycerides when used in this invention relate to both a pure monoester glyceride and a mixture of monoesters and diesters of glycerine. The monoglycerides should be at least 86% saturated, that is, at least 80 mol percent of the fatty acid molecular segment of the monoglyceride comprises saturated fatty acids. In a preferred embodiment of this invention the degree of saturation is at least about 88%. Unsaturated fatty acid esters which may be used in minor amounts such as the glycerol esters of oleic, lineolic, vaccenic, liconic, and catoleic acids as well as other unsaturated fatty acids which may contain about 12 to about 22 carbon atoms. However, any saturated fatty acid containing from 8 to about 24 carbon atoms may be used in conjunction with mixtures of minor amounts of unsaturated fatty acids as disclosed above.

The mono and diglycerides which are used in accordance with this invention may be prepared by transesterification, glycerolysis, or direct esterification of glycerin. Transesterification is generally accomplished by mixing sufficient glycerin with a triglyceride so that during the reaction the mol ratio of glycerin to the fatty acid is adjusted to achieve the desired amount of monoglyceride with residual triglycerides and diglycerides. Preferred glycerides are manufactured by the fatty acids resulting from hydrogenated edible tallow and usually contain 54% alpha monosubstituted material.

In addition to the saturated fatty acid monoglycerides, an additional hydrophilic component comprising an ethoxylated fatty acid ester of sorbitan is required. In particular the monoesters of sorbitan made by condensing sorbitol with the saturated fatty acids described above is included. These compositions are further reacted with ethylene oxide and contain about 15–25 mols of ethylene oxide per mol of monoester. These compositions are prepared according to the teachings found in U.S. Pat. Nos. 3,785,993 and 3,859,445 which are hereby considered incorporated by reference. The weight ratio of the mono and diglyceride to the ethoxylated sorbitol derivative may range from 1.5–4 to 1.

Furthermore, hydrated monoglycerides, that is, compositions which are blended or homogenized with about 40–50% water can be used in place of the unhydrated mono and diglycerides.

The above hydrated emulsifier blends are employed in cake batters in concentrations of 1.0–5.0% and preferably 4–5% based on the weight of the flour. Slightly higher concentrations may be employed with only minor benefits resulting.

The shortenings normally employed in cake manufacture are in general triglyceride oils or fats derived from animal sources such as lard or tallow and from plant sources such as seed oils of corn, cotton, soybean, and the like. It is normal practice for the shortenings to be refined and processed to improve their properties. The usual treatment includes catalytic hydrogenation to improve the plasticity, increase hardness, and reduce the iodine value of the fatty material and heat treatment in the presence of alkaline catalysts or without added glycerine to improve the physical properties of the functionality.

Cake flour prepared by grinding soft winter wheat which has an ash content of 0.34–0.38% and a protein content of 7.0–9.0% is preferred.

The incorporation of a chemical leaving agent functions as a means for aerating the batter. These agents in contact with liquid and heat react chemically to yield carbon dioxide gas in controlled volumes and at controlled rates of gas evolution. Most baking powders are mixtures of sodium bicarbonate with an acidic material which react with the bicarbonate and yield not less than 12% by weight of available carbon dioxide. When high fructose corn syrup is used in place of sucrose, the selection of this acidic material is critical. In the practice of this invention the leavening agent must be of the single stage non-nucleating type, such as a slow acting sodium aluminum phosphate, which normally does not react with sodium bicarbonate when initially dispersed in the batter to form bubbles of carbon dioxide in addition to the incorporated air.

Most cake batters also include eggs, egg whites, flavoring, color agents, nonfat dry milk solids, other fillers and salt.

The following examples will serve to illustrate the preparation of several cakes employing the emulsifier blend in combination with high fructose corn syrup/corn syrup and a chemical leavening agent. Conventional formulas, as shown in Tables 1, 2, and 3 using sucrose, are also shown for the purpose of comparison in a high sugar/flour ratio white cake, yellow cake and snack cake recipes. While the blends of HFCS/CS range from 40/60 to 60/40 combinations in the examples, it is contemplated that higher and lower concentrations of HFCS are functional for a wide variety of formulations not exemplified but having 100–200% by weight based upon the weight of the flour of a blend of a HFCS/CS blend.

Water, HFCS/CS, and shortening are added to the dry mix in a Hobart bowl with paddle and mixed for 2 minutes at slow speed. Additional water, whole eggs and egg whites are added and mixed until proper batter specific gravity measurement results (3–5 minutes).

Place 350 grams of batter in 5×20 cms. pans,
Bake at (165° C.) for 27 minutes,
Cool for two hours and serve.

Comparative results shown in Table 4 are typical of cake made according to the invention and which are equivalent to or better than cakes made according to conventional sugar sweetened recipes. Cake made with 100% HFCS/CS in place of sugar using the conventional control formulas and leavening agents are brown, gummy, doughy and often totally collapsed. A wide variation in cake properties is obtained with choice in ingredients and preparation technique.

TABLE 1

SPONGE TYPE SNACK CAKE

| Control 1 Recipe with Sucrose (Parts by wt.) | Ingredient | Example 1 Recipe with HFCS/CS (Parts by wt.) |
|---|---|---|
| 100.0 | Cake Flour | 100.0 |
| 114.0 | Sucrose (granulated sugar) | 0.2 |
| 0.0 | High Fructose Corn Syrup (58/42) | 94.0 |
| 0.0 | Corn Syrup (42 D.F.) | 58.0 |
| 1.8 | Baking Powder | 0.0 |
| 0.0 | Sodium Aluminum Phosphate[1] | 1.8 |
| 2.1 | Baking Soda | 2.1 |
| 1.7 | Salt | 1.7 |
| 20.3 | Whole Eggs | 20.3 |
| 92.6 | Water | 55.7 |
| 3.0 | Hydrated Emulsifier containing 37.5% mono and diglycerides, 18% Polysorbate 60 and 45% water | 4.0 |

[1]LEVN-LITE® -leavening agent sold by Monsanto Chemical Co., U.S.A.

TABLE 2

130% YELLOW CAKE

| Control 1 Recipe with Sucrose (Parts by wt.) | Ingredients | Example 1 Recipe with HFCS/CS (Parts by wt.) |
|---|---|---|
| 100.0 | Cake Flour | 100.0 |
| 130.0 | Sucrose | 0.0 |
| 0.0 | High Fructose Corn Syrup 40/60 | 73.2 |
| 0.0 | Corn Syrup (42 Dextrose Equiv.) | 95.1 |
| 12.5 | Non-Fat Dry Milk Solids | 12.5 |
| 1.9 | Salt | 1.9 |
| 4.9 | Baking Powder | 0.0 |
| 0.0 | Sodium Aluminum Phosphate[1] | 2.6 |
| 0.0 | Baking Soda | 1.9 |
| 20.0 | Powdered Egg Yolk | 20.0 |
| 40.9 | Shortening | 40.9 |
| 0.0 | Hydrated Emulsifier containing 37.5% mono and diglycerides, 12.5% Polysorbate 60 and 50% water | 4.0 |
| 25.0 | Whole Eggs | 25.0 |
| 106.0 | Water | 70.0 |

[1]LEVN-LITE® -leavening agent sold by Monsanto Chemical Co., U.S.A.

TABLE 3

115% WHITE CAKE

| Control 3 Recipe with Sucrose (Parts by wt.) | Ingredients | Example 3 Recipe with HFCS/CS (Parts by wt.) |
|---|---|---|
| 100.0 | Cake Flour | 100.0 |
| 114.7 | Sucrose | 0.0 |
| 0.0 | High Fructose Corn Syrup (54)/46 | 87.5 |
| 0.0 | Corn Syrup (42 Desctrose Equiv.) | 63.9 |
| 9.76 | Nonfat Dry Milk Solids | 9.76 |
| 5.00 | Baking Powder | 0.0 |
| 0.0 | Sodium Aluminum Phosphate[1] | 2.1 |
| 0.0 | Baking Soda | 1.95 |
| 21.0 | Shortening | 21.0 |
| 0.0 | Hydrated Emulsifier containing 37.5% mono and diglycerides, 12.5% Polysorbate (60) and 50% water | 4.0 |
| 61.3 | Water | 26.8 |

TABLE 3-continued

| 115% WHITE CAKE | | |
|---|---|---|
| Control 3 Recipe with Sucrose (Parts by wt.) | Ingredients | Example 3 Recipe with HFCS/CS (Parts by wt.) |
| 24.8 | Water | 24.8 |
| 5.0 | Whole Eggs | 5.0 |
| 34.9 | Egg Whites | 34.9 |

(1)LEVN-LITE® -leavening agent sold by Monsanto Chemical Co., U.S.A.

TABLE 4

| | BAKING RESULTS | | |
|---|---|---|---|
| Example No. | Batter Specific Gravity gms/cc | Cake Volume cc/cake | Comments |
| Control 1 | .69 | 112 | Even grain, good color |
| Example 1 | .65 | 114 | Even grain, good color |
| Control 2 | .87 | Good | Coarse grain, soft golden color |
| Example 2 | .83 | Vol. increase over Control 2 = +65 cc | Good color, grain & texture |
| Control 3 | .95 | Good | White color, soft even grain |
| Example 3 | .95 | Vol. increase over Control 3 = −3 cc | Lighter in color, slightly firm/crumb |

What is claimed is:

1. A cake batter comprising flour, sweetener, a chemical leavening agent and shortening wherein said sweetener is 100–200% by weight based on the weight of the flour and consists of a blend a high fructose corn syrup and corn syrup, said blend having the ratio of 40/60–60/40 parts by weight, respectively of said high fructose corn syrup and corn syrup and said chemical leavening agent is a non-nucleating single-stage leavening system, said batter further comprising from 0.2–3.7% based on the weight of the flour of an emulsifier blend consisting of mono and diglycerides of fat forming fatty acids and ethoxylated sorbitan monostearate; the weight ratio of the mono and diglycerides to the ethyloxated sorbitan derivative being 1.5/1–4/1.

2. A composition of claim 1 wherein said chemical leavening agent comprises sodium aluminum phosphate and sodium bicarbonate.

3. A composition of claim 1 wherein said mono-diglycerides is a product of hydrogenated tallow.

4. A composition of claim 1 wherein said ethoxylated sorbitan monostearate is polyoxyethylene(20)sorbitan monostearate.

* * * * *